United States Patent Office 3,264,284
Patented August 2, 1966

3,264,284
**5-AMINOALKYL-5,7-DIHYDRO-6H-DIBENZO[d,f]
[1,3]DIAZEPIN-6-ONE COMPOUNDS**
John Davoll, Shepperton, Middlesex, England, assignor to Parke, Davis & Company, Detroit, Mich., a corporation of Michigan
No Drawing. Filed Jan. 15, 1964, Ser. No. 337,726
Claims priority, application Great Britain, Jan. 18, 1963, 2,410/63
7 Claims. (Cl. 260—239.3)

The present invention relates to novel dibenzodiazepinone compounds and to methods for their production. More particularly, the invention relates to 5-aminoalkyl-5,7 - dihydro-6H-dibenzo[d,f][1,3]diazepin-6-one compounds, which in their free base form have the formula (I) 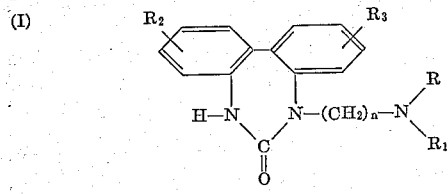

and to acid-addition salts thereof; where $n$ is 2 or 3; R is hydrogen, methyl, ethyl, or benzyl; $R_1$ is methyl or ethyl; and $R_2$ and $R_3$ are the same and are both hydrogen, methyl, or halogen, preferably chlorine.

In accordance with the invention, compounds of the above formula, where R is methyl, ethyl, or benzyl, and $n$, $R_1$, $R_2$, and $R_3$ have the aforementioned significance, are prepared by reacting an alkali metal salt of a 5,7-dihydro-6H-dibenzo[d,f][1,3]diazepin-6-one compound of the formula (II) 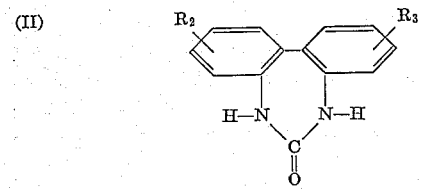

with an aminoalkylhalide of the formula (III) 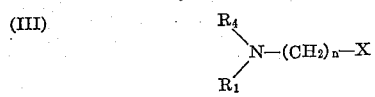

where $R_4$ is methyl, ethyl, or benzyl, X is halogen, and $n$, $R_1$, $R_2$, and $R_3$ have the same significance as given above. Suitable non-reactive solvents for the reaction are hydrocarbons, such as benzene, toluene, or xylene; ethers, such as dioxane, tetrahydrofuran, dibutyl ether, or glycol ethers having no free hydroxyl group; tertiary amides, such as dimethylformamide; and mixtures of these. Preferred solvents are dioxane and xylene. The temperature and duration of the reaction may be varied over a wide range from 40° C. for 24 hours to 200° C. for 1–2 hours. A preferred method is to heat the reaction mixture at the reflux temperature of the solvent for 2–10 hours. Equimolar amounts of the reactants may be used; it is preferable, however, to employ the aminoalkylhalide in slight excess. The alkali metal salt of the 5,7-dihydro-6H-dibenzo[d,f][1,3]diazepin - 6 - one compound is most conveniently prepared in situ by heating a mixture of the dibenzodiazepinone compound of Formula II and an alkali metal amide, such as sodamide, or an alkali metal hydride, such as sodium hydride, at the reflux temperature of the reaction solvent until salt formation is complete. If desired, the reaction may be carried out in a single step by refluxing a mixture of the dibenzodiazepinone compound, the aminoalkylhalide, and the alkali metal amide, or alkali metal hydride, in the chosen solvent until reaction is complete. The products of the reaction are isolated directly as free bases or following conversion to an acid-addition salt.

Some of the dibenzodiazepinone compounds of Formula II, which are the starting materials employed in the above process, have not previously been known and are prepared by reacting a diaminobiphenyl compound of the formula, (IV) 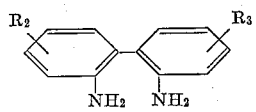

wherein $R_2$ and $R_3$ have the aforementioned significance, with urea at a temperature between 180° C. and 210° C. until evolution of ammonia ceases. The previously unknown diaminobiphenyl compounds of Formula IV can be prepared by the reduction, by chemical or catalytic means, of the corresponding dinitrobiphenyl compounds.

Also in accordance with the invention, 5-aminoalkyl-5,7 - dihydro-6H-dibenzo[d,f][1,3]diazepin-6-one compounds having the formula (V) 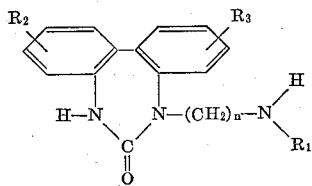

and acid-addition salts thereof are prepared by the hydrogenolysis of 5 - aminoalkyl-5,7-dihydro-6H-dibenzo[d,f] [1,3]diazepin-6-one compounds having the formula (VI) 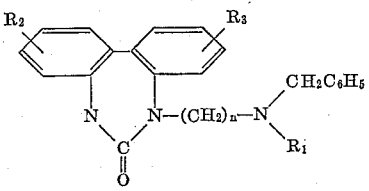

or acid-addition salts thereof. In Formulas V and VI, $n$, $R_1$, $R_2$, and $R_3$ are as defined in Formula I. The hydrogenolysis may be accomplished by employing gaseous hydrogen and a hydrogenation catalyst, or by employing a chemical reducing agent, such as an alkali metal, e.g., sodium dissolved in liquid ammonia. When catalytic means are employed, the preferred solvent is a lower alkanol, such as ethanol. A variety of other solvents, such as tetrahydrofuran, 1,2-dimethoxyethane, dibutyl ether, and other ethers, dimethylformamide, glacial acetic acid, benzene, toluene, and xylene, and mixtures of these, may also be used. When the acid-addition salts of compounds having Formula VI are employed, water may be used as the solvent. The preferred hydrogenation catalyst is palladium on charcoal; however, platinum and other noble metal catalysts may also be used. The hydrogenolysis is ordinarily carried out at room temperature and atmospheric pressure until the amount of hydrogen required to remove the benzyl group is taken up. A temperature range of 15–75° C. and hydrogen pressures up to 3–4 atmospheres, however, may also be conveniently employed. When chemical means of reduction are employed, the dibenzodiazepinone compounds of Formula VI are treated with a slight excess of an alkali metal, such as sodium, in liquid ammonia, the ammonia is allowed to evaporate, and the product is isolated from the residue.

In accordance with yet another process, 5-alkylamino- 5,7-dihydro-6H-dibenzo[d,f][1,3]diazepin-6-one compounds of the invention having the formula, (VII) 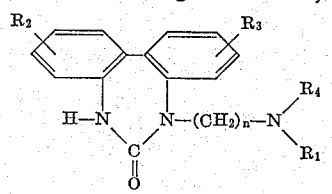

are prepared by reacting a 2-amino-2'-(aminoalkylamino)-biphenyl compound of the formula (VIII) 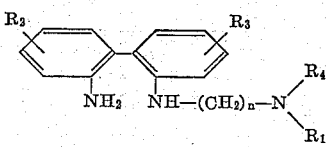

with a reactive derivative of carbonic acid, wherein $R_4$ is methyl, ethyl, or benzyl, and $n$, $R_1$, $R_2$, and $R_3$ have the same significance as in Formula I. Suitable reactive derivatives of carbonic acid for this purpose include compounds of the formula

where X and Y each represents a lower alkoxy, aralkoxy, or aryloxy radical, an amino radical, a halogen atom, preferably chlorine, or are combined as a lower alkylimino, aralkylimino, or arylimino radical, as well as other reactive derivatives such as carbon dioxide and alkali metal salts of cyanic acid. Preferred derivatives of carbonic acid include urea, phosgene, ammonium carbamate, lower alkyl carbamates (urethanes), and lower alkyl chloroformates. At least one equivalent of the reactive derivative of carbonic acid is normally employed; for maximum yields, however, an excess of this reagent is preferred. The reaction is normally carried out at temperatures between about 0 and 250° C., depending on the reactants selected. With phosgene or a lower alkyl chloroformate, the reaction is normally carried out below 50° C., whereas with reactants such as urea, ammonium carbamate, and urethanes, temperatures between 100° and 250° C. are used. The reaction can be carried out either with or without a solvent. Suitable solvents are ethers, such as diethyl ether, tetrahydrofuran, and glycol ethers having no free hydroxyl group; hydrocarbons, such as benzene and toluene; halogenated hydrocarbons; and similar unreactive solvents. When urea is employed, it is preferable to carry out the reaction in the absence of a solvent. In some instances the yield is improved by carrying out the reaction in the presence of an acidic or basic reagent or catalyst. When using carbon dioxide as a reactant, the reaction is preferably conducted under high pressure. Depending on the choice of reagents and isolation procedure, the products may be obtained as the free bases or in the form of one of their acid-addition salts.

The 2-amino-2'-(aminoalkylamino)-biphenyl compounds of Formula VIII, used as starting materials in the above process, can be prepared by the reduction, by catalytic or chemical means, of biphenyl compounds of the formula (IX) 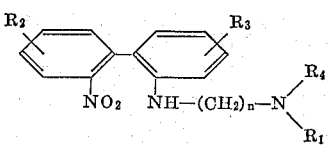

The biphenyl compounds of Formula IX can be prepared by the alkylation of compounds of the formula (X) 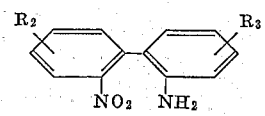

or N-formyl derivatives thereof, with an aminoalkylhalide of the formula (XI) 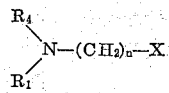

When N-formyl derivatives of compounds of Formula X are used, the N-formyl group is removed by hydrolysis prior to reduction of the nitro group. The compounds of Formula X are prepared by the selective reduction, by catalytic or chemical means, of one of the nitro groups of 2,2'-dinitrobiphenyl compounds of the formula (XII) 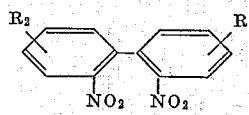

In Formulas IX, X, XI, and XII, $n$, $R_4$, $R_1$, $R_2$, and $R_3$ have the same significance as in Formula VII; in Formula XI, X is halogen.

The compounds of the invention can exist in the free base form having Formula I or in the form of one of their acid-addition salts with a variety of inorganic or organic acids. Some representative nontoxic, pharmaceutically-acceptable acid-addition salts are the hydrochloride, hydrobromide, sulfate, hydroiodide, nitrate, phosphate, acetate, propionate, benzoate, citrate, maleate, tartrate, succinate, sulfamate, p-toluenesulfonate, and benzenesulfonate. When it is desired to employ the compounds of the invention in the form of one of their acid-addition salts, the salt formation is suitably carried out by reacting the selected base with the selected acid in an unreactive solvent. The acid-addition salts can be converted to the free bases by reaction with a base such as sodium hydroxide or potassium hydroxide.

The compounds of the invention are useful pharmacological agents. They are central nervous system stimulants and diuretic agents. As central nervous system stimulants they are capable of suppressing reserpine- and tetrabenazine-induced depression. By virtue of such activity, they can be used as psychic energizers or antidepressants. They are preferably administered orally, although they are also active upon parenteral administration. The preferred compound for use as a diuretic agent is 5 - (β - dimethylaminoethyl)-5,7-dihydro-6H-dibenzo[d,f][1,3]diazepin-6-one.

The invention is illustrated by the following examples:

*Example 1*

A stirred mixture of 7 g. of 5,7-dihydro-6H-dibenzo[d,f][1,3]diazepin-6-one and 1.04 g. of sodamide in 200 ml. of dry dioxane is heated under reflux for one hour until evolution of ammonia ceases. The mixture, now containing the sodium salt of 5,7-dihydro-6H-dibenzo[d,f][1,3]diazepin-6-one, is cooled to 60° C., a solution of 2.9 g. of N,N-dimethyl-β-chloroethylamine in 40 ml. of dry dioxane is added, with stirring, over a period of 30 minutes, and the stirred mixture is heated under reflux for 4 hours. After cooling, 10 ml. of methanol is added to destroy unreacted sodamide, and the mixture is filtered. The solvent is evaporated from the filtrate, the residue is extracted with cold, dilute hydrochloric acid, and the acidic extract is filtered. The filtrate is made alkaline with aqueous ammonia, the alkaline mixture is extracted with ether, and the ether solution is dried and evaporated to dryness to give 5-(β-dimethylaminoethyl)-5,7-dihydro-6H-dibenzo[d,f][1,3]diazepin-6-one, M.P. 124–128° C., after recrystallization from ethyl acetate.

The same product is obtained by employing the above procedure when an equivalent amount of N,N-dimethyl-β-bromoethylamine is substituted for N,N-dimethyl-β-chloroethylamine.

In the foregoing procedure, 3.06 g. of N,N-dimethyl-γ-chloropropylamine may be substituted for the N,N-dimethyl-β-chloroethylamine to prepare 5-(γ-dimethylaminopropyl) - 5,7 - dihydro-6H-dibenzo[d,f][1,3]diazepin-6-one, M.P. 116–119° C., after crystallization from an ether-ethyl acetate solvent mixture.

The hydrochloride salt of 5-(β-dimethylamino)-5,7-dihydro-6H-dibenzo[d,f][1,3]diazepin-6-one is prepared by treating an ethereal solution of the free base with a slight excess of dry hydrogen chloride, concentrating the resulting mixture, and isolating the precipitated salt.

Example 2

A stirred mixture of 10.5 g. of 5,7-dihydro-6H-dibenzo[d,f][1,3]diazepin-6-one, 1.95 g. of sodamide, and 6.7 g. of N,N-dimethyl-γ-chloropropylamine in 400 ml. of xylene is heated under reflux for 7 hours. After cooling, 10 ml. of methanol is added, and the mixture is extracted with 2N aqueous hydrochloric acid. The acidic aqueous layer is isolated and filtered, and the filtrate is made basic with aqueous ammonia. The basic mixture is extracted with ethyl acetate, and the ethyl acetate solution is dried and evaporated to dryness to give 5-(γ-dimethylaminopropyl) - 5,7 - dihydro - 6H-dibenzo[d,f][1,3]diazepin-6-one, M.P. 116–119° C., after crystallization from a mixture of ethyl acetate and petroleum ether.

A solution of 3 g. of the free base in 25 ml. of ethyl acetate is treated with 1.2 g. of maleic acid, the resulting mixture is concentrated and the precipitated maleate salt of 5 - (γ-dimethylaminopropyl)-1,7-dihydro-6H-dibenzo[d,f][1,3]diazepin-6-one is isolated by filtration and crystallized from a mixture of ethyl acetate, ethanol, and ether; M.P. 122–124° C.

In the procedure described above, an equivalent amount of N,N-diethyl-γ-chloropropylamine may be substituted for N,N-dimethyl-γ-chloropropylamine to prepare 5 - (γ - diethylaminopropyl)-5,7-dihydro-6H-dibenzo[d,f][1,3]diazepin-6-one, M.P. 77–78° C.

Example 3

A stirred mixture of 7.12 g. of 3,9-dimethyl-5,7-dihydro-6H-dibenzo[d,f][1,3]diazepin-6-one, 1.16 g. of sodamide, and 3.99 g. of N,N-dimethyl-γ-chloropropylamine in 250 ml. of xylene is heated under reflux for 10 hours. After cooling, 10 ml. of methanol is added, and the mixture is extracted with 2N aqueous hydrochloric acid. The acidic aqueous layer is isolated and filtered, and the filtrate is made basic with aqueous ammonia. The basic mixture is extracted with ethyl acetate, and the ethyl acetate solution is dried and evaporated to dryness to give 5-(γ-dimethylaminopropyl)-3,9-dimethyl-5,7 - dihydro - 6H - dibenzo[d,f][1,3]diazepin - 6 - one, M.P. 147°, after recrystallization from ethyl acetate-n-hexane.

An ethanolic solution of the free base is treated with a slight excess of dry hydrogen bromide, the resulting mixture is concentrated and the precipitated hydrobromide salt of 5-(γ-dimethylaminopropyl)-3,9-dimethyl-5,7-dihydro-6H-dibenzo[d,f][1,3]diazepin-6-one is isolated by filtration, washed with ether, and dried.

In the foregoing procedure, an equivalent amount of 1,11-dimethyl-5,7-dihydro - 6H - dibenzo[d,f][1,3]diazepin-6-one may be substituted for 3,9-dimethyl-5,7-dihydro-6H-dibenzo[d,f][1,3]diazepin-6-one to prepare 5-(γ-dimethylaminopropyl)-1,11-dimethyl-5,7 - dihydro - 6H-dibenzo[d,f][1,3]diazepin-6-one, M.P. 131–133° C.

The 3,9-dimethyl-5,7-dihydro - 6H - dibenzo[d,f][1,3]diazepin-6-one, used as starting material in the method of this example, is prepared as follows:

An intimate mixture of 10 g. of 2,2'-diamino-4,4'-dimethylbiphenyl and 5.67 g. of urea is heated in an oil bath at 200–210° C. until evolution of ammonia ceases, and the mass has solidified. The solid is dissolved in hot glacial acetic acid, the solution is cooled, and the crystalline 3,9-dimethyl-5,7-dihydro - 6H - dibenzo[d,f][1,3]diazepin-6-one containing acetic acid of crystallization is isolated and dried at 100° C.; M.P. 337–338° C. The crystalline solid is treated with aqueous sodium carbonate to neutralize the acetic acid, and the free 3,9-dimethyl-5,7-dihydro-6H-dibenzo[d,f][1,3]diazepin-6-one obtained is isolated by filtration, dried, and used without further purification.

Example 4

A stirred mixture of 6.5 g. of 3,9-dichloro-5,7-dihydro-6H-dibenzo[d,f][1,3]diazepin-6-one and 0.9 g. of sodamide in 200 ml. of dry dioxane is heated under reflux for 1½ hours. The mixture is cooled to 60° C., 3.46 g. of N,N-dimethyl-γ-chloropropylamine is added, and the stirred mixture is refluxed for an additional 13 hours. After cooling, 10 ml. of methanol is added, the mixture is filtered, and the solvent is evaporated from the filtrate. The residue is extracted with cold 2N aqueous hydrochloric acid, the acidic extract is made basic with aqueous ammonia, and the basic mixture is extracted with ethyl acetate. The ethyl acetate solution is dried and evaporated to dryness to give 5-(γ-dimethylaminopropyl)-3,9-dichloro-5,7 - dihydro - 6H - dibenzo[d,f][1,3]diazepin-6-one, M.P. 196–197° C., after recrystallization from a mixture of ether and petroleum ether.

The same product is obtained by employing the foregoing procedure when an equivalent amount of sodium hydride is substituted for sodamide.

The 3,9-dichloro-5,7-dihydro - 6H - dibenzo[d,f][1,3]diazepin-6-one, used as starting material, is prepared as follows:

An intimate mixture of 9.3 g. of 2,2'-diamino-4,4'-dichlorobiphenyl and 4.47 g. of urea is heated in an oil bath at 180–200° C. for 45 minutes. The solid obtained is recrystallized from acetic acid to give 3,9-dichloro-5,7-dihydro-6H-dibenzo[d,f][1,3]diazepin - 6 - one containing acetic acid of crystallization, M.P. 342–343° C. The free base is obtained by washing this solid with a dilute aqueous solution of sodium carbonate, and drying.

Example 5

A stirred mixture of 8.37 g. of 2,10-dichloro-5,7-dihydro-6H-dibenzo[d,f][1,3]diazepin-6-one, 1.17 g. of sodamide, and 4.0 g. of N,N-dimethyl-γ-chloropropylamine in 200 ml. of xylene is refluxed for 7 hours, and the product is isolated according to the procedure described in Example 3 above to give 5-(γ-dimethylaminopropyl)-2,10-dichloro-5,7-dihydro - 6H - dibenzo[d,f][1,3]diazepin-6-one, M.P. 177–178° C., after recrystallization from ethyl acetate-ether.

The acetate salt of 5-(γ-dimethylaminopropyl)-2,10-dichloro-5,7-dihydro - 6H - dibenzo[d,f][1,3]diazepin-6-one can be prepared by treating an ethereal solution of the free base with an excess of glacial acetic acid, isolating the product from the solution and drying under reduced pressure after washing with dry ether.

The 2,10-dichloro-5,7-dihydro - 6H - dibenzo[d,f][1,3]diazepin-6-one, used as a starting material, is prepared as follows:

A solution of 34 g. of 5,5'-dichloro-2,2'-dinitrobiphenyl in 500 ml. of ethanol is hydrogenated at atmospheric pressure and room temperature in the presence of a platinum on charcoal catalyst to give 2,2'-diamino-5,5'-dichlorobiphenyl, M.P. 129–130° C., after crystallization from aqueous ethanol. An intimate mixture of 24 g. of 2,2'-diamino-5,5'-dichlorobiphenyl and 11.5 g. of urea is heated in an oil bath at 180–200° C. for 45 minutes. The solid obtained is crystallized from acetic acid to give 2,10-dichloro-5,7-dihydro - 6H - dibenzo[d,f][1,3]diazepin-6-one containing acetic acid of crystallization; M.P. 333° C. The free base is obtained by washing with a dilute aqueous solution of sodium carbonate and drying in vacuo.

Example 6

A stirred mixture of 33 g. of 5,7-dihydro-6H-dibenzo[d,f][1,3]diazepin-6-one and 6.1 g. of sodamide in 900 ml. of dry dioxane is refluxed for 2½ hours. After cooling to 60° C., 36 g. of N-benzyl-N-methyl-γ-chloropropylamine is added, and the stirred mixture is refluxed for an additional 18 hours. After cooling, 20 ml. of methanol is added, the mixture is filtered, and the solvent is evaporated from the filtrate. The residue is extracted with a mixture containing equal amounts of dilute hydrochloric acid and ethanol, and the extract is made basic with aqueous ammonia, diluted with water, and extracted with ethyl acetate. The ethyl acetate solution is dried and evaporated to dryness to give 5-[γ-(N-benzyl-N-methylamino)-propyl]-5,7-dihydro - 6H - dibenzo[d,f][1,3]diazepin-6-one, M.P. 119–120° C., after crystallization from 80% aqueous ethanol.

In the foregoing procedure, an equivalent amount of 1,11-dimethyl-5,7 - dihydro - 6H - dibenzo[d,f][1,3]diazepin-6-one may be substituted for 5,7-dihydro-6H-dibenzo[d,f][1,3]diazepin-6-one to prepare 5-[γ-(N-benzyl-N-methylamino)-propyl]-1,11-dimethyl-5,7-dihydro - 6H-dibenzo[d,f][1,3]diazepin-6-one.

*Example 7*

A solution of 21.4 g. of 5 - [γ - (N - benzyl - N - methyl-amino) - propyl] - 5,7 - dihydro - 6H - dibenzo[d,f]-[1,3]-diazepin-6-one in 200 ml. of ethanol containing a 10% palladium on charcoal catalyst is hydrogenated at atmospheric pressure and room temperature. The catalyst is removed by filtration, the filtrate is evaporated to dryness, and the residue is dissolved in ethanol. The ethanolic solution is treated with 6.43 ml. of 9.1 N aqueous hydrobromic acid and the precipitated hydrobromide salt of 5 - (γ - methylaminopropyl) - 5,1 - dihydro - 6H-dibenzo[d,f][1,3]diazepin - 6 - one is crystallized from absolute ethanol to give the salt containing one mole of ethanol of crystallization; M.P. 214–215° C.

The free base, 5 - (γ - methylaminopropyl) - 5,7-dihydro - 6H - dibenzo[d,f][1,3]diazepin - 6 - one, is obtained by treating an aqueous solution of the hydrobromide salt with a slight excess of sodium hydroxide, isolating the product from the alkaline solution, and drying in vacuo.

In the foregoing procedure, an equivalent amount of 5 - [γ - (N - benzyl - N - methylamino) - propyl] - 1,11-dimethyl - 5,7 - dihydro - 6H - dibenzo[d,f][1,3]diazepin-6-one may be substituted for 5 - [γ - (N - benzyl - N-methylamino) - propyl] - 5,7 - dihydro - 6H - dibenzo-[d,f][1,3]diazepin - 6 - one to prepare 5 - (γ - methyl-aminopropyl) - 1,11 - dimethyl - 5,7 - dihydro - 6H - dibenzo[d,f][1,3]diazepin-6-one.

A solution of 2.8 g. of 5 - (γ - methylaminopropyl)-5,7 - dihydro - 6H - dibenzo[d,f][1,3] - diazepin - 6 - one in 25 ml. of ethyl acetate is treated with 1.2 g. of maleic acid, the resulting mixture is concentrated and the precipitated maleate salt of 5 - (γ - methylaminopropyl)-5,7 - dihydro - 6H - dibenzo[d,f][1,3]diazepin - 6 - one is isolated by filtration and crystallized from ethanol-ether; M.P. 165–166° C.

*Example 8*

A solution of 1.5 g. of 2 - (γ - dimethylamino-propyl-amino) - 2' - nitrobiphenyl in 100 ml. of ethanol containing a 10% palladium on charcoal catalyst is hydrogenated at room temperature and atmospheric pressure. The catalyst is removed by filtration, and the solvent is removed from the filtrate by evaporation. The crude 2 - amino - 2' - (γ - dimethylaminopropylamino) - biphenyl obtained is intimately mixed with 0.6 g. of urea and the mixture is heated in an oil bath at 180–185° C. for 30 minutes. The solid product is extracted with 2 N aqueous hydrochloric acid, the acidic solution is made basic with aqueous ammonia, and the basic mixture is extracted with ethyl acetate. The organic solution is dried and evaporated to dryness to give 5 - (γ - dimethyl-aminopropyl) - 5,7 - dihydro - 6H - dibenzo[d,f][1,3]-diazepin-6-one, M.P. 116–118° C., after recrystallization from ethyl acetate-n-hexane.

The same product is obtained by employing the above procedure when 0.8 g. of ammonium carbamate is substituted for 0.6 g. of urea.

The 2 - (γ - dimethylaminopropylamino) - 2' - nitrobiphenyl, used as starting material, is obtained as follows:

A stirred mixture of 2.42 g. of 2 - nitro - 2' - form-amidobiphenyl, and 0.43 g. of sodamide in 40 ml. of toluene is refluxed for 20 minutes. After cooling to 60° C., 1.34 g. of N,N - dimethyl - γ - chloropropylamine is added and the stirred mixture is refluxed for an additional 4 hours. After cooling, 5 ml. of methanol is added, and the mixture is extracted with 2 N aqueous hydrochloric acid. The acidic solution is made basic with aqueous ammonia, the basic mixture is extracted with ethyl acetate, and the ethyl acetate solution is dried and evaporated to dryness. The yellow syrup obtained is heated with 20 ml. of concentrated hydrochloric acid on the steam bath for 4 hours, then evaporated to dryness, and the residue is dissolved in water. The aqueous solution is made basic with dilute aqueous sodium hydroxide, and the 2-(γ-dimethylaminopropylamino) - 2' - nitrobiphenyl obtained is isolated and recrystallized from ethanol; M.P. 100–102° C.

I claim:

1. A member of the class consisting of 5-amino-alkyl-5,7-dihydro-6H-dibenzo[d,f][1,3]diazepin - 6 - one compounds having the formula

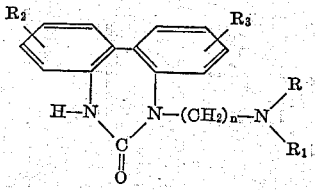

and non-toxic acid-addition salts thereof; where $n$ is chosen from between 2 and 3; R is a member of the class consisting of hydrogen, methyl, ethyl, and benzyl; $R_1$ is a member of the class consisting of methyl and ethyl; and $R_2$ and $R_3$ are the same and are both chosen from the class consisting of hydrogen, methyl, or halogen.

2. 5 - (γ - dimethylaminopropyl) - 5,7-dihydro-6H-dibenzo[d,f][1,3]diazepin-6-one.

3. 5 - (γ-methylaminopropyl)-5,7-dihydro-6H-dibenzo[d,f][1,3]diazepin-6-one.

4. 5 - (γ - diethylaminopropyl)-5,7-dihydro-6H-dibenzo[d,f][1,3]diazepin-6-one.

5. Non-toxic acid-addition salts of 5-amino-alkyl-5,7-dihydro-6H-dibenzo[d,f][1,3]diazepin-6-one compounds having the formula

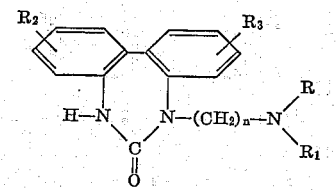

wherein $n$ is chosen from between 2 and 3; R is a member of the class consisting of hydrogen, methyl, ethyl, and benzyl; $R_1$ is a member of the class consisting of methyl and ethyl; and $R_2$ and $R_3$ are the same and are both chosen from the class consisting of hydrogen, methyl, or halogen.

6. 5 - (γ - dimethylaminopropyl) - 5,7-dihydro-6H-dibenzo[d,f][1,3]diazepin-6-one maleate.

7. 5 - (γ - methylaminopropyl)-5,7-dihydro-6H-dibenzo[d,f][1,3]diazepin-6-one maleate.

References Cited by the Examiner

Niementowski, "Berichte," vol. 34, pp. 3330–31 (1901).

WALTER A. MODANCE, *Primary Examiner.*

R. T. BOND, *Assistant Examiner.*